United States Patent
Huang

(10) Patent No.: US 7,928,704 B2
(45) Date of Patent: Apr. 19, 2011

(54) DROOP CIRCUITS AND MULTI-PHASE DC-DC CONVERTERS

(75) Inventor: Hua-Chiang Huang, Hsin-Chu (TW)

(73) Assignee: UPI Semiconductor Corporation, Taipei (TW)

(*) Notice: Subject to any disclaimer, the term of this patent is extended or adjusted under 35 U.S.C. 154(b) by 476 days.

(21) Appl. No.: 12/081,668

(22) Filed: Apr. 18, 2008

(65) Prior Publication Data
US 2009/0051334 A1    Feb. 26, 2009

Related U.S. Application Data

(60) Provisional application No. 60/957,947, filed on Aug. 24, 2007.

(51) Int. Cl.
*G05F 1/59* (2006.01)
(52) U.S. Cl. ............ 323/271; 323/272; 323/286
(58) Field of Classification Search .......... 323/271, 323/272, 282, 285, 286
See application file for complete search history.

(56) References Cited

U.S. PATENT DOCUMENTS

| | | | |
|---|---|---|---|
| 6,683,441 B2 | 1/2004 | Schiff et al. | |
| 7,064,528 B2 | 6/2006 | Jochum et al. | |
| 7,230,406 B2 * | 6/2007 | Huang et al. | 323/222 |
| RE39,976 E * | 1/2008 | Schiff et al. | 323/285 |
| 2004/0090217 A1* | 5/2004 | Muratov et al. | 323/282 |
| 2008/0169797 A1* | 7/2008 | Zambetti et al. | 323/285 |
| 2008/0197826 A1* | 8/2008 | Schiff et al. | 323/282 |
| 2010/0148738 A1* | 6/2010 | Schiff | 323/282 |

* cited by examiner

*Primary Examiner* — Jeffrey L Sterrett
(74) *Attorney, Agent, or Firm* — Birch, Stewart, Kolasch & Birch, LLP

(57) ABSTRACT

A droop circuit of a DC-DC converter is provided, wherein the DC-DC converter includes an output inductor coupled between an output of the DC-DC converter and a phase node for providing an output voltage. A current sense device is coupled between the phase node and the output of the DC-DC converter, includes an inductor coupled to the phase node and senses a current from the phase node. A first resistor is coupled to the current sense device. An amplifier circuit includes an amplifier having an inverting input, a non-inverting input coupled to the first resistor and an output directly connected to the inverting input, and a second resistor coupled between the inverting input and the output of the DC-DC converter. The amplifier circuit provides a droop current according to the second resistor and a voltage difference between the non-inverting input and the output of the DC-DC converter, and the voltage difference is related to the current.

12 Claims, 10 Drawing Sheets

US 7,928,704 B2

DROOP CIRCUITS AND MULTI-PHASE DC-DC CONVERTERS

This application claims the benefit of U.S. Provisional Application Ser. No. 60/957,947, filed Aug. 24, 2007.

BACKGROUND OF THE INVENTION

1. Field of the Invention

The invention relates to a droop circuit, and more particularly to a multi-phase DC-DC converter with a droop circuit.

2. Description of the Related Art

In general, a droop circuit can control a swing of an output voltage in a DC-DC converter. FIG. 1A shows an output voltage of a DC-DC converter without a droop circuit, and FIG. 1B shows an output voltage of a DC-DC converter with a droop circuit. As shown in FIG. 1A, the output voltage is operated at a normal voltage $V_{nom}$ except for a time $t_1$ and a time $t_2$. Transients of the output voltage are generated due to an output current $I_1$ which is varied with a load of the DC-DC converter, and rapidly increases and decreases at the time $t_1$ and the time $t_2$. Referring to FIG. 1B, an output current $I_2$ of the DC-DC converter with a droop circuit rapidly increases and decreases at a time $t_3$ and a time $t_4$. The output voltage is operated at a minimum voltage $V_{min}$ during a duration between the time $t_3$ and $t_4$. However, the output voltage is operated at the normal voltage $V_{nom}$ outside of the duration between the time $t_3$ and $t_4$. Thus, for a DC-DC converter, transients of the output voltage are avoided by the droop circuit.

FIG. 2 shows a conventional multi-phase switching regulator disclosed in U.S. Pat. No. 6,683,441. In FIG. 2, an amplifier circuit 28 generates a voltage $V_{cs}$ according to an output voltage $V_{out}$ and a summing voltage of a summing node 26. Then, the output voltage $V_{out}$ is subtracted from the voltage $V_{cs}$ to generate a droop voltage $V_{droop}$ by a summation circuit 30. Thus, the multi-phase switching regulator needs the summation circuit 30 to obtain the droop voltage $V_{droop}$, and the output voltage $V_{cs}$ of the amplifier circuit 28 is equal to the output voltage $V_{out}$ plus the droop voltage $V_{droop}$. FIG. 3 shows a conventional droop amplifier circuit disclosed in U.S. Pat. No. 7,064,528 for generating a droop voltage VDROOP. In FIG. 3, a positive polarity (+) of the droop voltage VDROOP is provided by an output of an amplifier A2, and a negative polarity (−) of the droop voltage VDROOP is provided by an output node of a multi-phase DC-DC regulator. Hence, an output voltage of the amplifier A2 is equal to an output voltage VOUT of the multi-phase DC-DC regulator plus the droop voltage VDROOP.

BRIEF SUMMARY OF THE INVENTION

Droop circuits and multi-phase DC-DC converters are provided. An exemplary embodiment of such a droop circuit for a DC-DC converter comprises a current sense device, a first resistor and an amplifier circuit, the DC-DC converter comprises an output inductor coupled between an output of the DC-DC converter and a phase node for providing an output voltage. The current sense device is coupled between the phase node and the output of the DC-DC converter, comprises an inductor coupled to the phase node and senses a current from the phase node. The first resistor is coupled to the current sense device. The amplifier circuit comprises an amplifier having an inverting input, a non-inverting input coupled to the first resistor and an output directly connected to the inverting input, and a second resistor coupled between the inverting input and the output of the DC-DC converter. The amplifier circuit provides a droop current according to the second resistor and a voltage difference between the non-inverting input and the output of the DC-DC converter, and the voltage difference is related to the current.

Furthermore, another exemplary embodiment of a droop circuit for a DC-DC converter comprises a current sense device, a first resistor and a voltage generator, wherein the DC-DC converter comprises an output inductor coupled between an output of the DC-DC converter and a phase node for providing an output voltage. The current sense device is coupled between the phase node and the output of the DC-DC converter, comprises an inductor coupled to the phase node and senses a current from the phase node. The first resistor is coupled to the current sense device. The voltage generator has a first input coupled to the first resistor, a second input coupled to the output of the DC-DC converter and an output for outputting a droop voltage. The voltage generator provides the droop voltage according to a voltage difference between the first input and a second input, and the voltage difference is related to the current.

Moreover, an exemplary embodiment of a multi-phase DC-DC converter comprises a plurality of switching sets, a plurality of output inductors, a pulse width modulation circuit and a droop circuit. The switching sets generate an output voltage at a first output, wherein each switching set comprises a phase node and receives a pulse width modulation signal to generate the output voltage. The output inductors are respectively coupled between the phase nodes and the first output. The pulse width modulation circuit provides the pulse width modulation signals according to the output voltage and a droop current. The droop circuit provides the droop current and comprises a plurality of current sense devices respectively coupled between the phase nodes and the first output, a plurality of first resistors respectively coupled to the current sense devices and an amplifier circuit. Each current sense device comprises an inductor and senses a current from the corresponding phase node. The amplifier circuit comprises an amplifier having an inverting input, a non-inverting input coupled to the first resistors and a second output directly connected to the inverting input, and a second resistor coupled between the inverting input and the first output. The amplifier circuit provides the droop current according to the second resistor and a voltage difference between the non-inverting input and the first output, and the voltage difference is related to an average of the currents.

Furthermore, another exemplary embodiment of a multi-phase DC-DC converter comprises a plurality of switching sets, a plurality of output inductors, a pulse width modulation circuit and a droop circuit. The switching sets generate an output voltage at a first output, wherein each switching set comprises a phase node and receives a pulse width modulation signal to generate the output voltage. The output inductors are respectively coupled between the phase nodes and the first output. The pulse width modulation circuit provides the pulse width modulation signals according to the output voltage and a droop voltage. The droop circuit provides the droop voltage, and comprises a plurality of current sense devices respectively coupled between the phase nodes and the first output, a plurality of first resistors respectively coupled to the current sense devices and a voltage generator. Each current sense device comprises an inductor and senses a current from the corresponding phase node. The voltage generator has a first input coupled to the first resistors, a second input coupled to the first output and a second output for outputting a droop voltage. The voltage generator provides the droop voltage according to a voltage difference between the first input and a second input, and the voltage difference is related to an average of the currents.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1B:
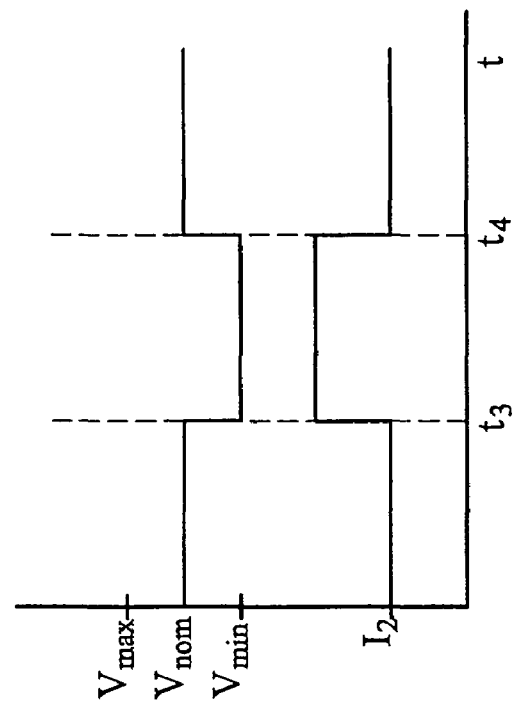
FIG. 1B shows an output voltage of a DC-DC converter with a droop circuit.
Figure 1A:
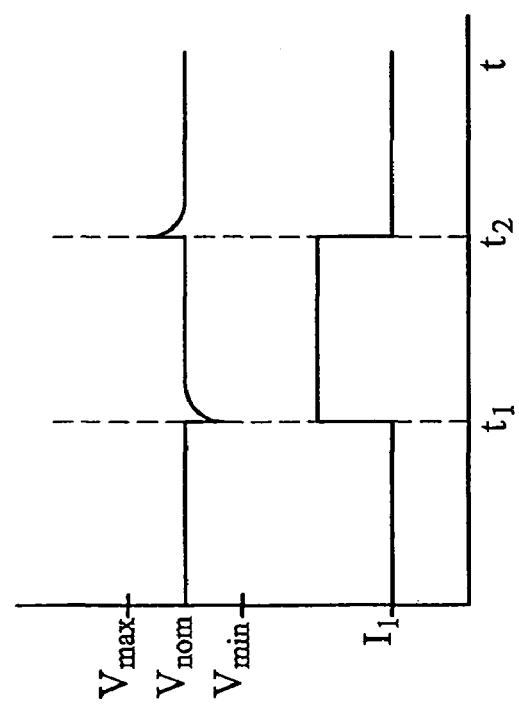
FIG. 1A shows an output voltage of a DC-DC converter without a droop circuit.
Figure 2:
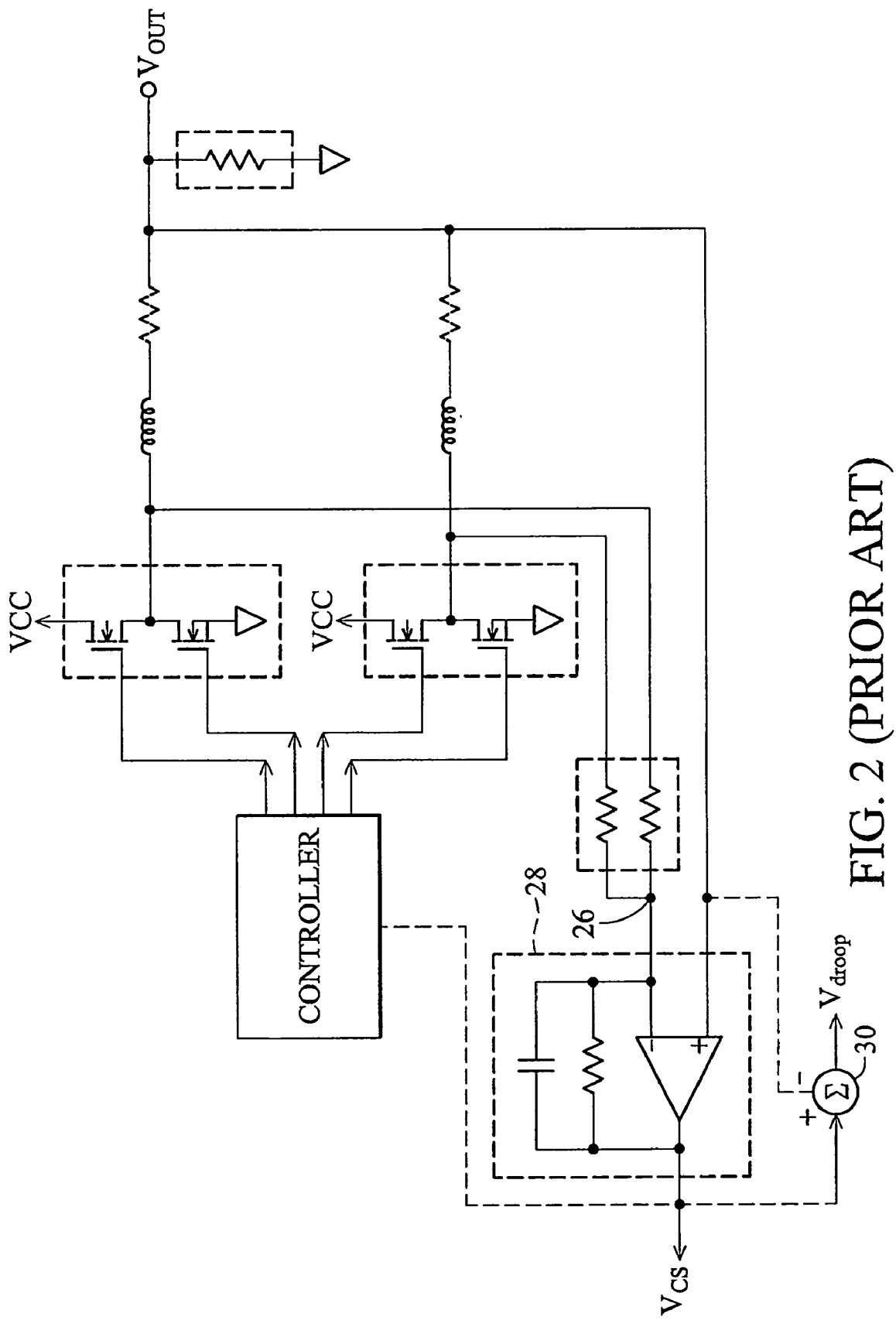
FIG. 2 shows a conventional multi-phase switching regulator.
Figure 3:
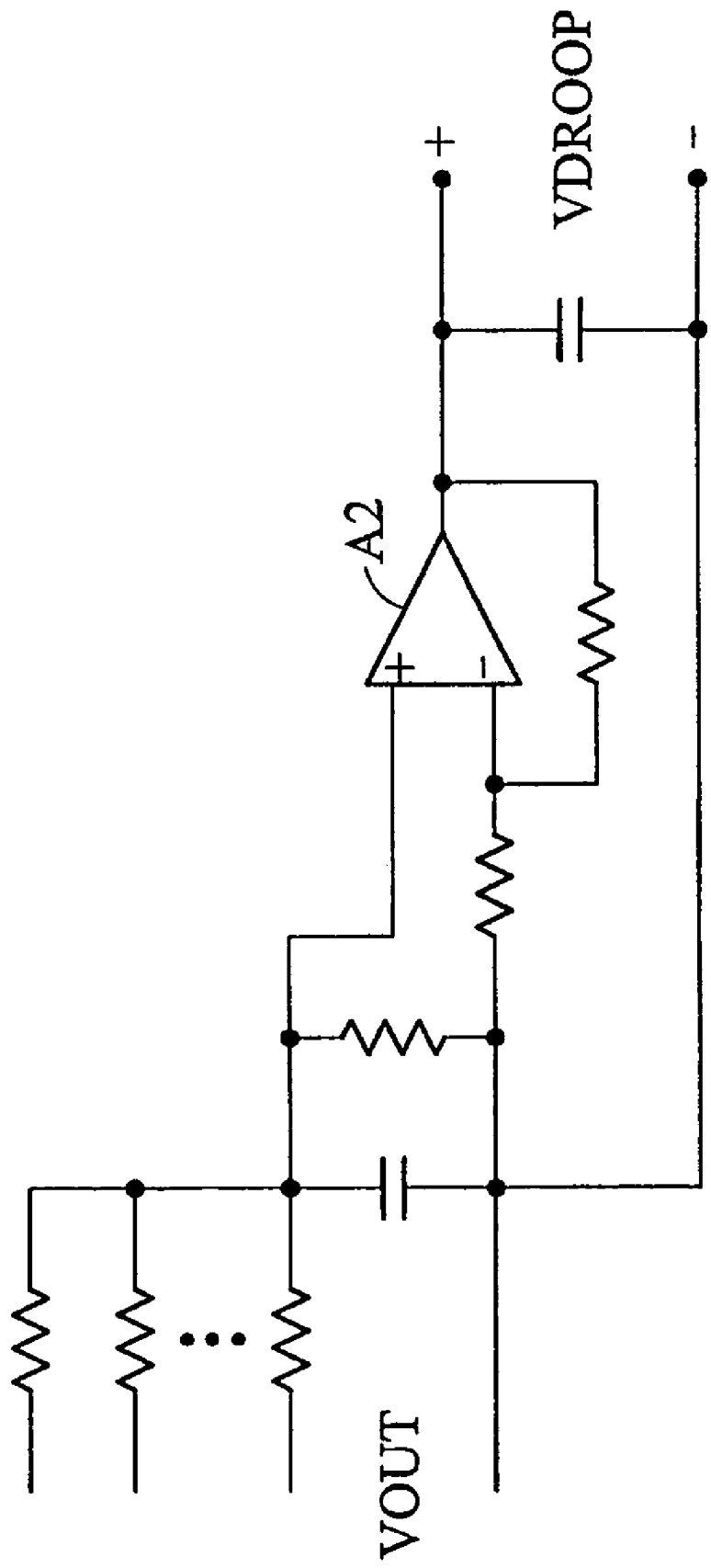
FIG. 3 shows a conventional droop amplifier circuit.
Figure 4:
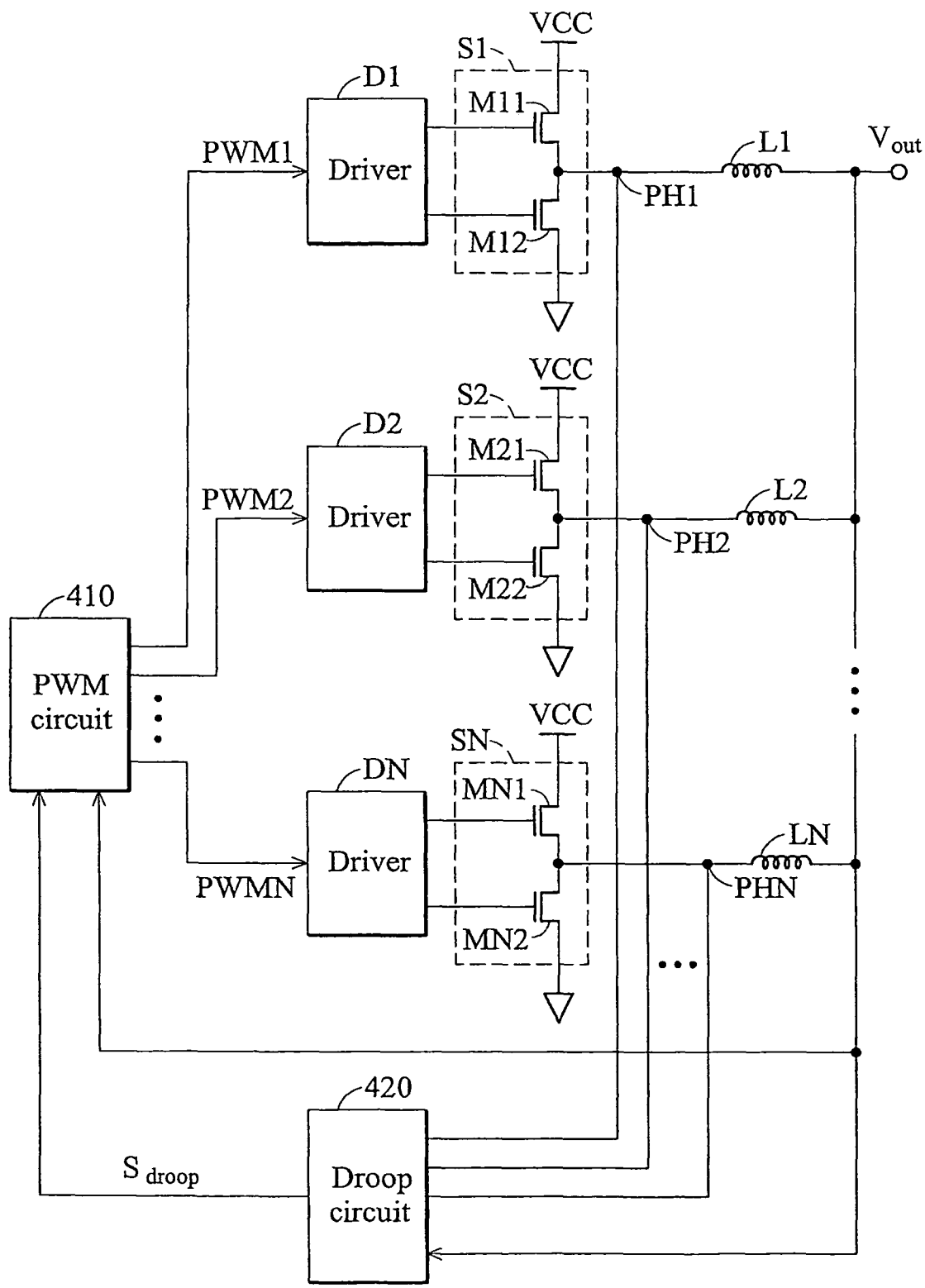
FIG. 4 shows a multi-phase DC-DC converter according to an embodiment of the invention.

FIG. 4 shows a multi-phase DC-DC converter 400 according to an embodiment of the invention. The multi-phase DC-DC converter 400 with N channels comprises a pulse width modulation (PWM) circuit 410, N drivers D1-DN, N switching sets S1-SN, N output inductors L1-LN and a droop circuit 420. The PWM circuit 410 provides N PWM signals PWM1-PWMN to the drivers D1-DN, respectively. The drivers D1-DN receive the PWM signals PWM1-PWMN to control the switching sets S1-SN, respectively. For example, the driver D1 receives the PWM signal PWM1 and generates a plurality of control signals to the switching set S1, which comprises two transistors M11 and M12, wherein the transistor M11 is coupled between a voltage VCC and a phase node PH1, and the transistor M12 is coupled between a ground GND and the phase node PH1. In addition, an output inductor L1 is coupled between the phase node PH1 and an output of the multi-phase DC-DC converter 400. In one embodiment, the switching set S1 may include the driver D1, and the transistors M11 and M12 may be switches. As shown in FIG. 4, the switching sets generate an output voltage $V_{out}$ at the output of the multi-phase DC-DC converter 400 through the output inductors. Furthermore, the output voltage $V_{out}$ is fed back to the PWM circuit 410 and the droop circuit 420. The droop circuit 420 generates a droop signal $S_{droop}$ according to the output voltage $V_{out}$ and the signals located at the phase nodes PH1-PHN, wherein the droop signal $S_{droop}$ may be a droop current signal or a droop voltage signal. Then, the PWM circuit 410 generates the PWM signals PWM1-PWMN to control a droop value of the output voltage $V_{out}$ according to the output voltage $V_{out}$ and the droop signal $S_{droop}$.

Figure 5A:
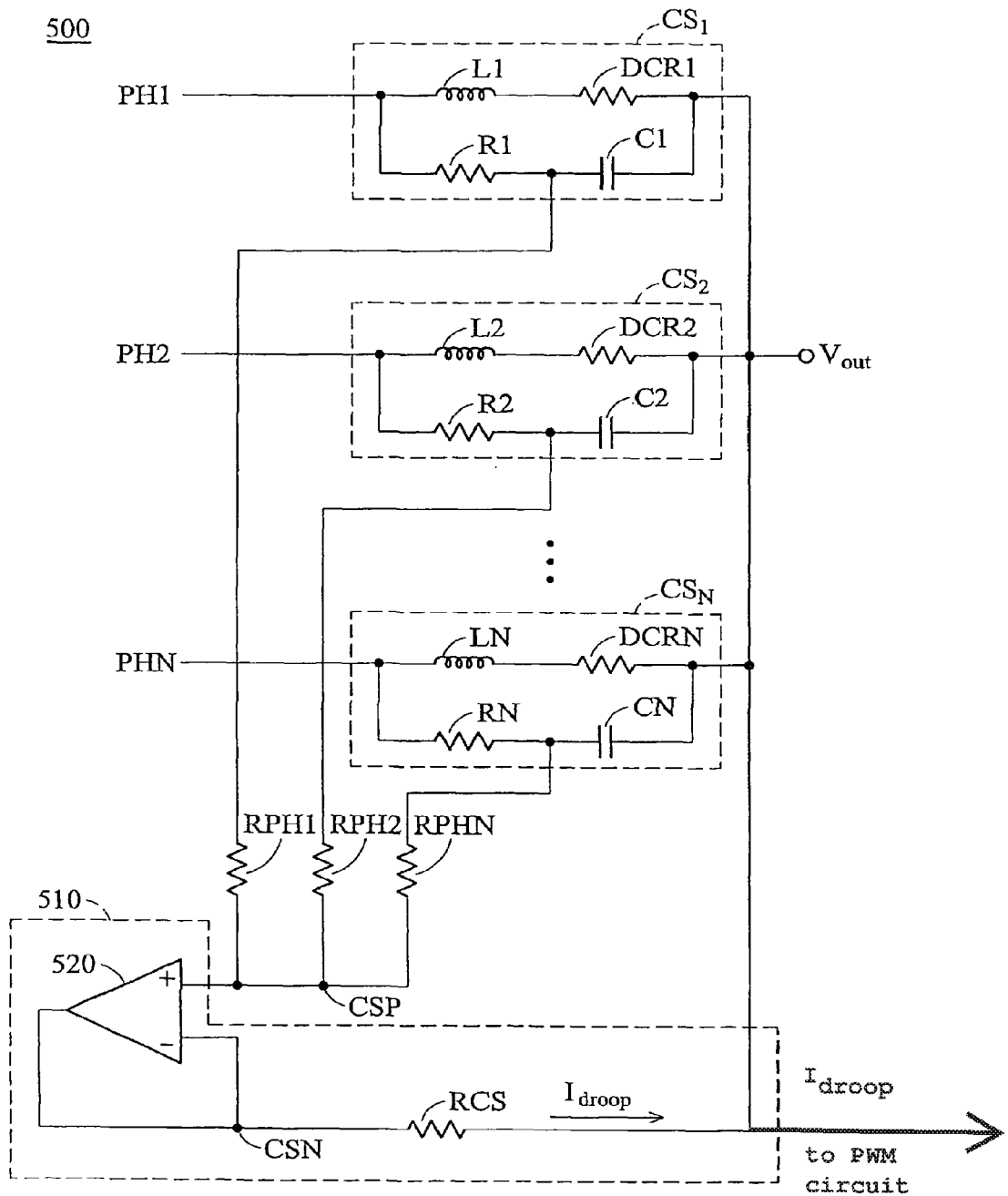
FIG. 5A shows a droop circuit with an amplifier according to an embodiment of the invention.

FIG. 5A shows a droop circuit 500 of the multi-phase DC-DC converter 400 according to an embodiment of the invention. The droop circuit 500 comprises a plurality of current sense devices CS and an amplifier circuit 510, wherein the amplifier circuit 510 comprises an amplifier 520 and a resistor RCS. Each current sense device CS is coupled between a corresponding phase node and the output of the DC-DC converter 400 and senses a current from the corresponding phase node. For example, a current sense device $CS_1$ is coupled between the phase node PH1 and the output of the DC-DC converter 400, and a current sense device $CS_2$ is coupled between the phase node PH2 and the output of the DC-DC converter 400. As shown in FIG. 5A, the current sense device $CS_1$ comprises an inductor L1, a capacitor C1 and two resistors DCR1 and R1, and is coupled to a non-inverting input CSP of the amplifier 520 through a resistor RPH1. The inductor L1 is coupled to the phase node PH1. Furthermore, the resistor DCR1 is coupled between the inductor L1 and the output voltage $V_{out}$. The resistor R1 is coupled between the inductor L1 and the resistor RPH1. The capacitor C1 is coupled between the resistor RPH1 and the output voltage $V_{out}$. The amplifier 520 has the non-inverting input CSP, an inverting input CSN and an output, wherein the output is directly connected to the inverting input CSN. In addition, the resistor RCS is coupled between the inverting input CSN and the output voltage $V_{out}$.

In FIG. 5A, if $$\frac{LM}{DCRM} = RM \times CM$$

(where M=1, 2 ... N) is established, a voltage difference between the non-inverting input CSP and the output of the DC-DC converter 400 is equal to $$\frac{(IL1 + IL2 + ... + ILN) \times DCR1}{N},$$

i.e. the voltage difference is related to an average of the currents sensed from the phase nodes. Therefore, amplifier circuit 510 can provide a droop current $I_{droop}$ to the PWM circuit 410 as shown in FIG. 4, wherein the droop current $I_{droop}$ is equal to $$\frac{(IL1 + IL2 + ... + ILN) \times DCR1}{N} \bigg/ RCS.$$

As described above, the PWM circuit 410 can generate the PWM signals PWM1-PWMN to control a droop value of the output voltage $V_{out}$ according to the droop current $I_{droop}$.

Figure 5B:
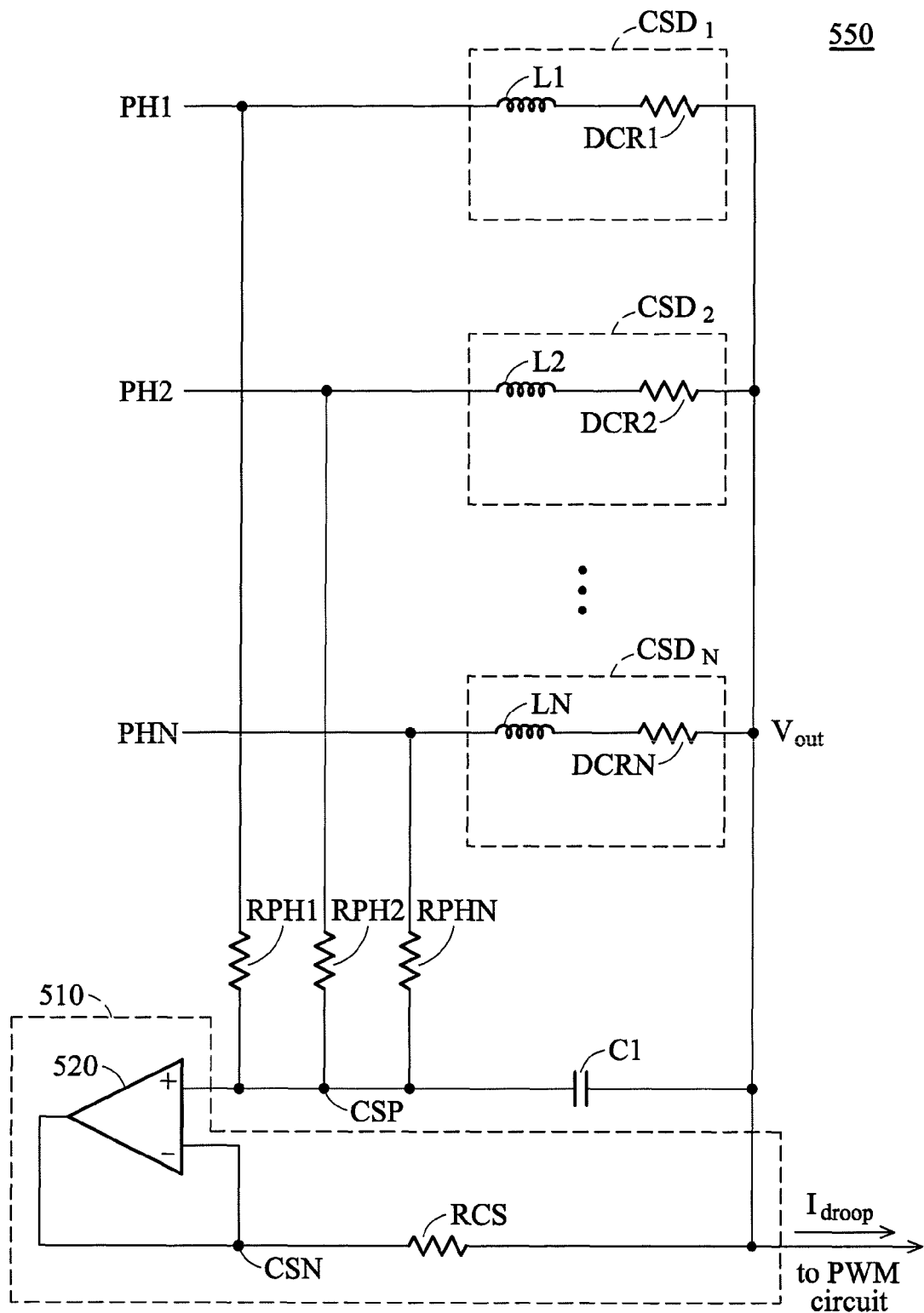
FIGS. 5B, 5C and 5D show a droop circuit with an amplifier according to another embodiment of the invention, respectively.

FIG. 5B shows a droop circuit 550 according to another embodiment of the invention. The droop circuit 550 comprises a plurality of current sense devices CSD, an amplifier circuit 510 and a capacitor C1, wherein the amplifier circuit 510 comprises an amplifier 520 and a resistor RCS. The capacitor C1 is coupled between a non-inverting input CSP of the amplifier 520 and the output of the DC-DC converter 400. Each current sense device CSD is coupled between a corresponding phase node and the output of the DC-DC converter 400 and senses a current from the corresponding phase node. For example, a current sense device $CSD_1$ is coupled between the phase node PH1 and the output of the DC-DC converter 400. As shown in FIG. 5B, the current sense device $CSD_1$ comprises an inductor L1 and a resistor DCR1. The inductor L1 is coupled to the phase node PH1. The resistor DCR1 is coupled between the inductor L1 and the output voltage $V_{out}$. The current sense devices $CSD_1$-$CSD_N$ are coupled to the non-inverting input CSP of the amplifier 520 through the resistors RPH1-RPHN, respectively. Similarly, the droop circuit 550 can provide a droop current $I_{droop}$ to the PWM circuit 410, wherein the droop current $I_{droop}$ is also equal to $$\frac{(IL1 + IL2 + \ldots + ILN) \times DCR1}{N} \Big/ RCS.$$

Figure 5C:
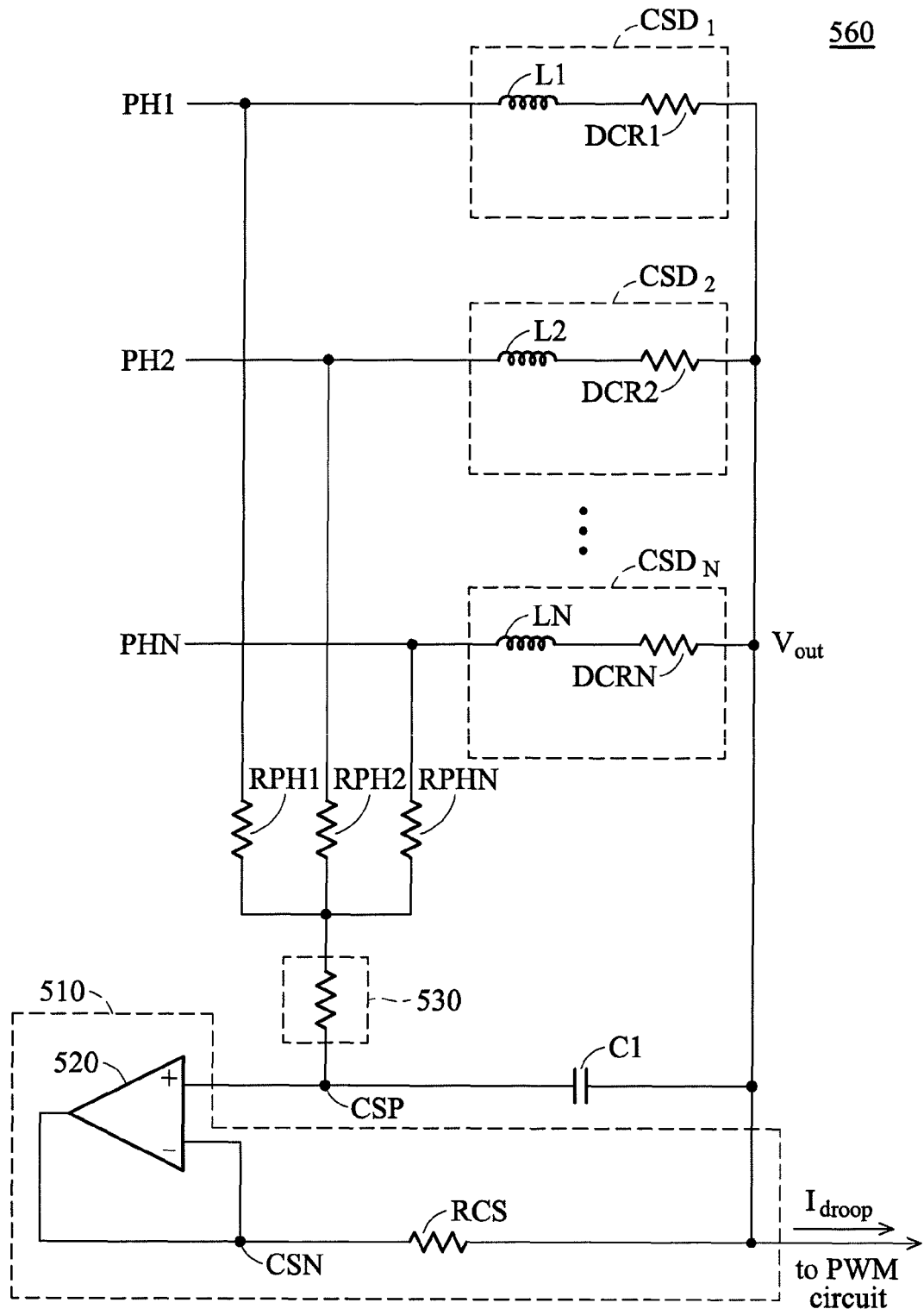
Figure 5D:
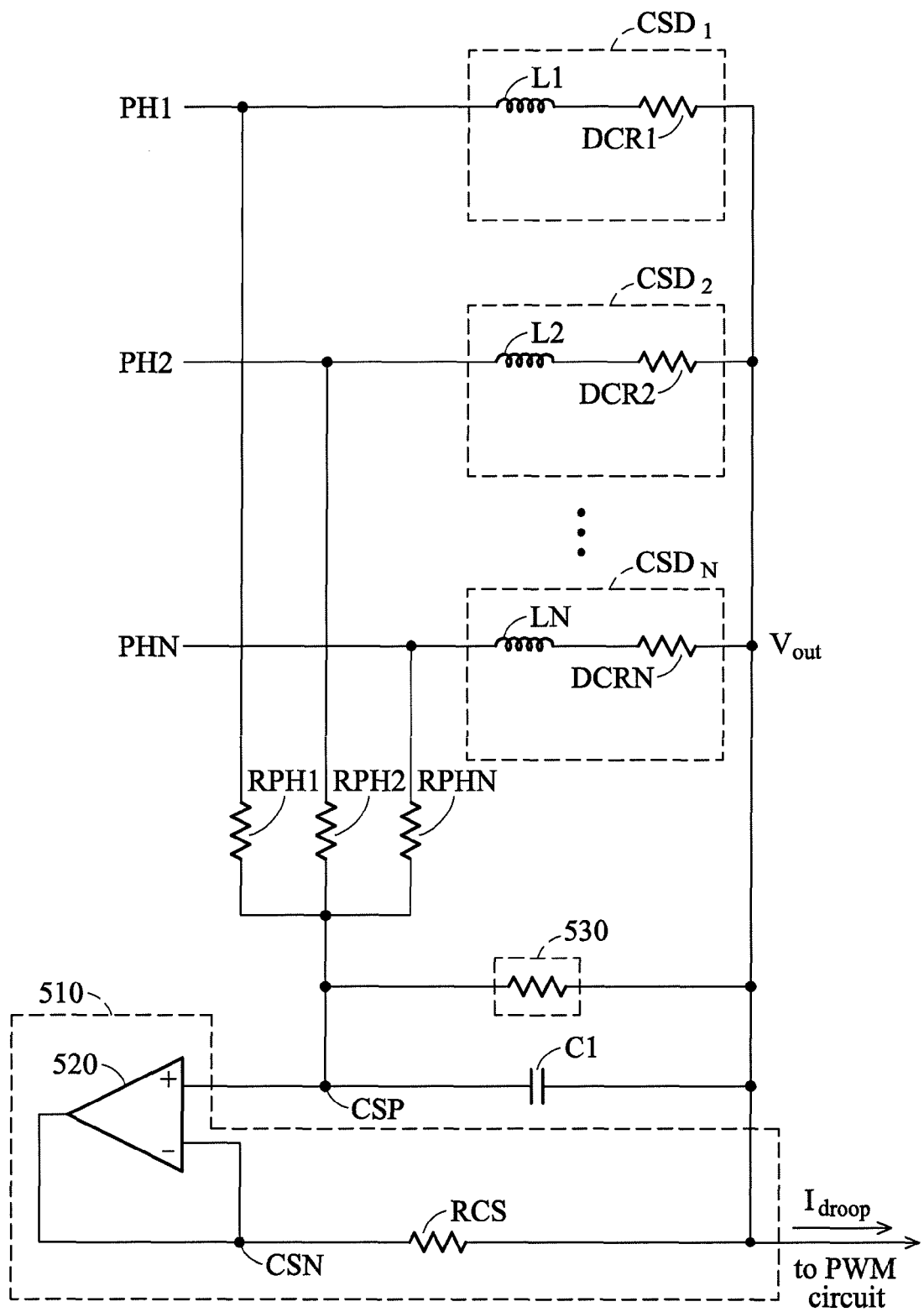

FIG. 5C shows a droop circuit 560 according to another embodiment of the invention. Compared with the droop circuit 550 shown in FIG. 5B, the droop circuit 560 further comprises a resistor network 530 consisted of parallel or series resistors for compensating the variations of the resistors DCR1-DCRN caused by temperature. The resistor network 530 is coupled between the non-inverting input CSP and the resistors RPH1-RPHN in FIG. 5C. Furthermore, in one embodiment, the resistor network 530 is coupled between the non-inverting input CSP and the output voltage $V_{out}$, as shown in FIG. 5D. Therefore, a user can control the capacitor C1 and the resistor network 530 to adjust an R-C network filter time constant of the droop current $I_{droop}$ generation.

Figure 6A:
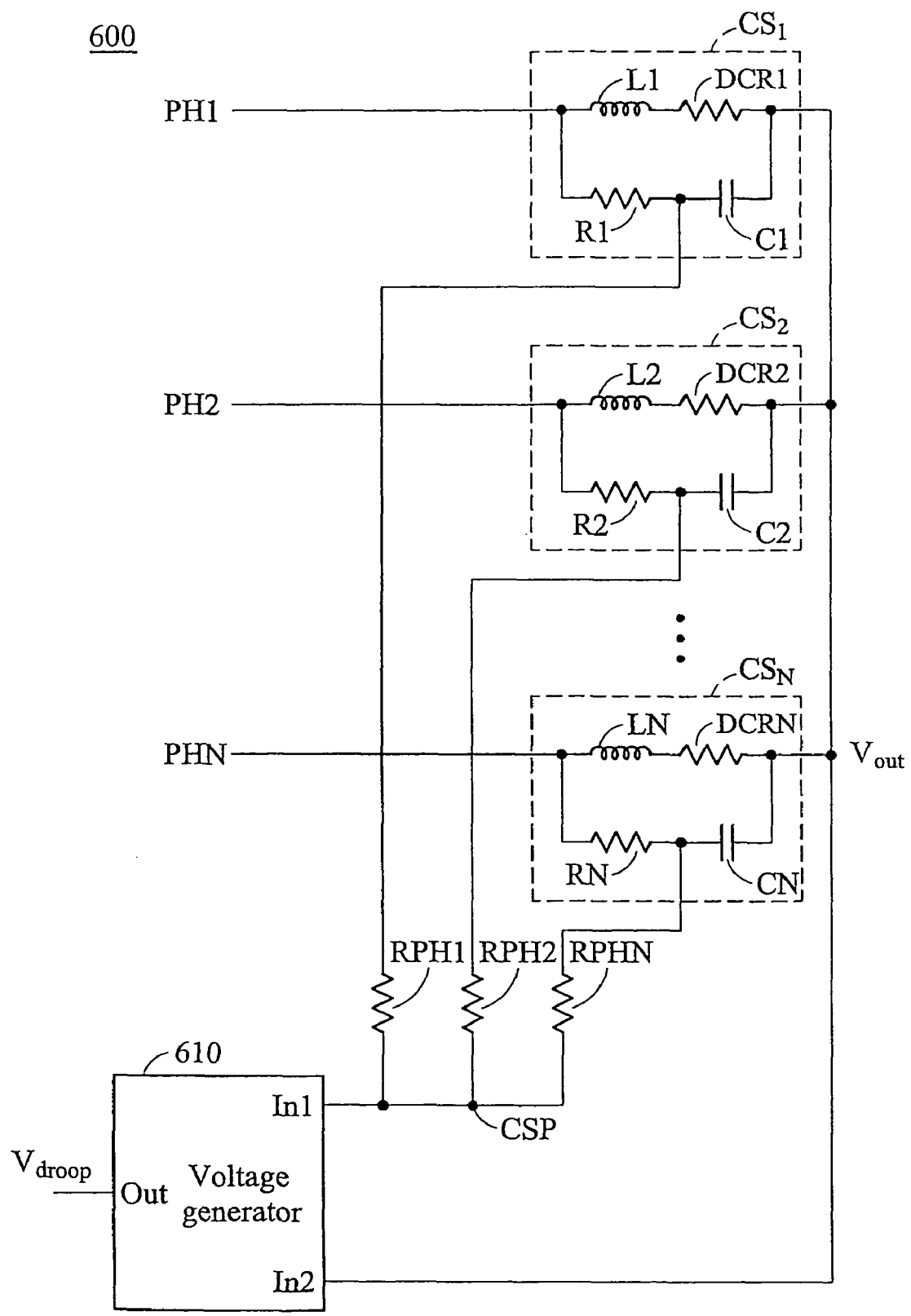
FIGS. 6A and 6B show a droop circuit with a voltage generator according to another embodiment of the invention, respectively.

FIG. 6A shows a droop circuit 600 of the DC-DC converter 400 according to another embodiment of the invention. The droop circuit 600 comprises a plurality of current sense devices CS and a voltage generator 610, wherein each current sense device CS is coupled between a corresponding phase node and the output of the DC-DC converter 400. The voltage generator 610 has a first input In1, a second input In2 and an output Out, wherein the first input In1 is coupled to the current sense devices $CS_1$-$CS_N$ through the resistors RPH1-RPHN, respectively. Furthermore, the second input In2 is coupled to the output of the DC-DC converter 400 to receive the output voltage $V_{out}$, and the output Out is output a droop voltage $V_{droop}$ to the PWM circuit 410 as shown in FIG. 4. The voltage generator 610 can provide the droop voltage $V_{droop}$ according to a voltage difference between the first input In1 and the second input In2. As described above, the voltage difference is related to an average of the currents sensed from the phase nodes.

Figure 6B:
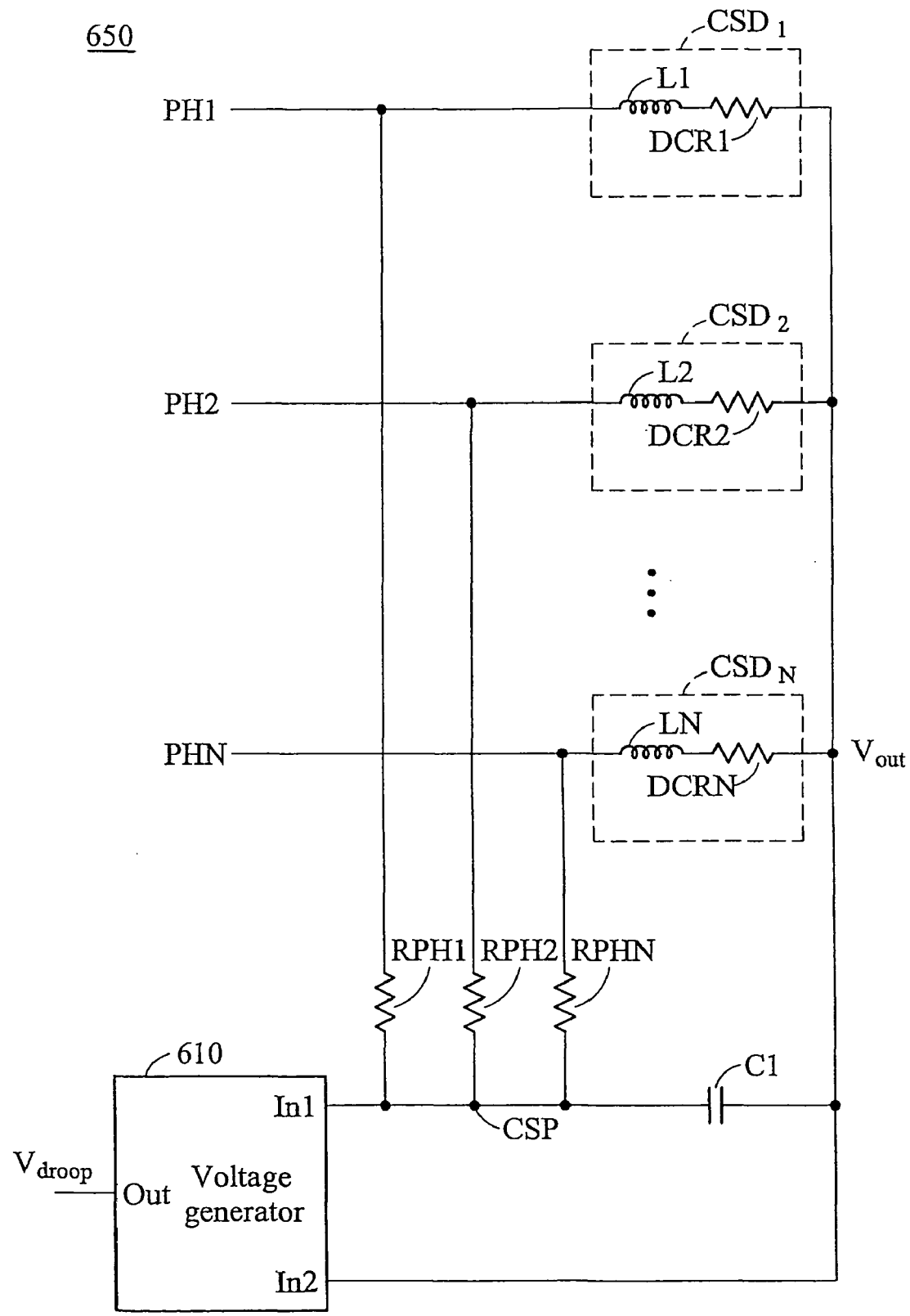

FIG. 6B shows a droop circuit 650 according to another embodiment of the invention. The droop circuit 650 comprises a plurality of current sense devices CSD, a voltage generator 610 and a capacitor C1. Each current sense device CSD is coupled between a corresponding phase node and the output of the DC-DC converter. The current sense devices $CSD_1$-$CSD_N$ are coupled to a first input In1 of the voltage generator 610 through the resistors RPH1-RPHN, respectively. The capacitor C1 is coupled between the first input In1 and the output of the DC-DC converter 400. A second input In2 is coupled to the output of the DC-DC converter 400 to receive the output voltage $V_{out}$. Similarly, the voltage generator 610 can provide a droop voltage $V_{droop}$ to the PWM circuit 410 as shown in FIG. 4 according to a voltage difference between the first input In1 and the second input In2. As described above, the PWM circuit 410 can generate the PWM signals PWM1-PWMN to control a droop value of the output voltage $V_{out}$ according to the droop voltage $V_{droop}$. In one embodiment, the droop circuit 650 further comprises the resistor network 530 shown in FIG. 5C or 5D to adjust an R-C network filter time constant of the droop voltage $V_{droop}$ generation.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A droop circuit for a DC-DC converter, comprising:
   a current sense device coupled between a phase node and an output of the DC-DC converter, comprising an inductor coupled to the phase node and sensing a current from the phase node;
   a first resistor coupled to the current sense device; and
   an amplifier circuit comprising:
      an amplifier having an inverting input, a non-inverting input coupled to the first resistor and an output directly connected to the inverting input; and
      a second resistor coupled between the inverting input and the output of the DC-DC converter,
   wherein the amplifier circuit provides a droop current according to the second resistor and a voltage difference between the non-inverting input and the output of the DC-DC converter, and the voltage difference is related to the current.

2. The droop circuit as claimed in claim 1, wherein the current sense device comprises:
   a third resistor coupled between the inductor and the output of the DC-DC converter;
   a capacitor coupled between the output of the DC-DC converter and the first resistor; and
   a fourth resistor coupled between the phase node and the first resistor.

3. The droop circuit as claimed in claim 1, further comprising a capacitor coupled between the non-inverting input and the DC-DC converter output.

4. The droop circuit as claimed in claim 3, wherein the current sense device comprises a third resistor coupled between the inductor and the output of the DC-DC converter.

5. The droop circuit as claimed in claim 4, further comprising a resistor network coupled between the first resistor and the non-inverting input for adjusting an R-C time constant to generate the droop current.

6. The droop circuit as claimed in claim 4, further comprising a resistor network coupled between the DC-DC converter output and the non-inverting input for adjusting an R-C time constant to generate the droop current.

7. A multi-phase DC-DC converter, comprising:
   a plurality of switching sets for generating an output voltage at a first output, wherein each switching set comprises a phase node and receives a pulse width modulation signal to generate the output voltage;
   a pulse width modulation circuit for providing the pulse width modulation signals according to the output voltage and a droop current; and
   a droop circuit for providing the droop current, comprising:
      a plurality of current sense devices respectively coupled between the phase nodes and the first output, wherein each current sense device comprises an inductor and senses a current from the corresponding phase node;
      a plurality of first resistors respectively coupled to the current sense devices; and
      an amplifier circuit comprising:
         an amplifier having an inverting input, a non-inverting input coupled to the first resistors and a second output directly connected to the inverting input; and a second resistor coupled between the inverting input and the first output, wherein the amplifier circuit provides the droop current according to the second resistor and a voltage difference between the non-inverting input and the first output, and the voltage difference is related to an average of the currents.

8. The multi-phase DC-DC converter as claimed in claim 7, wherein the current sense device comprises:

a third resistor coupled between the inductor and the first output;

a capacitor coupled between the first output and the first resistor; and a fourth resistor coupled between the phase node and the first resistor.

9. The multi-phase DC-DC converter as claimed in claim 7, further comprising a capacitor coupled between the non-inverting input and the first output.

10. The multi-phase DC-DC converter as claimed in claim 9, wherein the current sense device comprises a third resistor coupled between the inductor and the first output.

11. The multi-phase DC-DC converter as claimed in claim 10, further comprising a fourth resistor coupled between the first resistors and the non-inverting input for adjusting an R-C time constant to generate the droop current.

12. The multi-phase DC-DC converter as claimed in claim 10, further comprising a resistor network coupled between the first output and the non-inverting input for adjusting an R-C time constant to generate the droop current.

* * * * *